United States Patent [19]

Scarr et al.

[11] Patent Number: 4,601,027
[45] Date of Patent: Jul. 15, 1986

[54] OPTICAL FDM SYSTEM

[75] Inventors: Robert W. A. Scarr, Stansted; John Bingham, Dunmow, both of United Kingdom

[73] Assignee: International Standard Electric Corporation, New York, N.Y.

[21] Appl. No.: 622,940

[22] Filed: Jun. 21, 1984

[30] Foreign Application Priority Data

Jul. 1, 1983 [GB] United Kingdom ............... 8317962

[51] Int. Cl.$^4$ .............................................. H04B 9/00
[52] U.S. Cl. .................................. 370/3; 350/358; 455/617
[58] Field of Search ............... 370/1, 2, 3; 350/358; 455/617

[56] References Cited

U.S. PATENT DOCUMENTS

| | | | |
|---|---|---|---|
| 3,845,294 | 10/1974 | Indig et al. | 370/3 |
| 4,140,783 | 3/1979 | Desbois et al. | 370/3 |
| 4,468,766 | 8/1984 | Spezio | 370/3 |
| 4,530,084 | 7/1985 | Strebel et al. | 370/3 |

OTHER PUBLICATIONS

Griese—"Conference Systems"—Jour. of the Audio Eng. Soc., Jun. 1979, vol. 27, #6, pp. 503–506.
Huber et al.—"Wideband F-M System"—Applied Optics, vol. 18, #8, Apr. 15, 1979, pp. 1249–1252.

Primary Examiner—Joseph A. Orsino, Jr.
Attorney, Agent, or Firm—John T. O'Halloran

[57] ABSTRACT

In an optical fiber FDM system, the carriers are derived from the output of a high quality Master Oscillator, which output at frequency $f_0$ is applied to a Raman Nath modulator (RNM1) whose other input is a frequency $f_0$ this gives as its outputs (assuming a five channel system) $f_0-2f$, $f_0-f$, $f_0$, $f_0+f$ and $f_0+2f$. These are modulated by modulators (CM1, to CM5) with the signals to be sent, and the modulation results combined in a combiner CB for transmission to a remote station. The oscillator output is also sent to the remote stations where it is frequency-shifted by a Bragg modulator (BM) and the resultant similarly dealt with by a Raman Nath device (RNM2) to give five frequencies which are used to demodulate the channels. In an alternative the channel frequencies are switchable.

1 Claim, 3 Drawing Figures

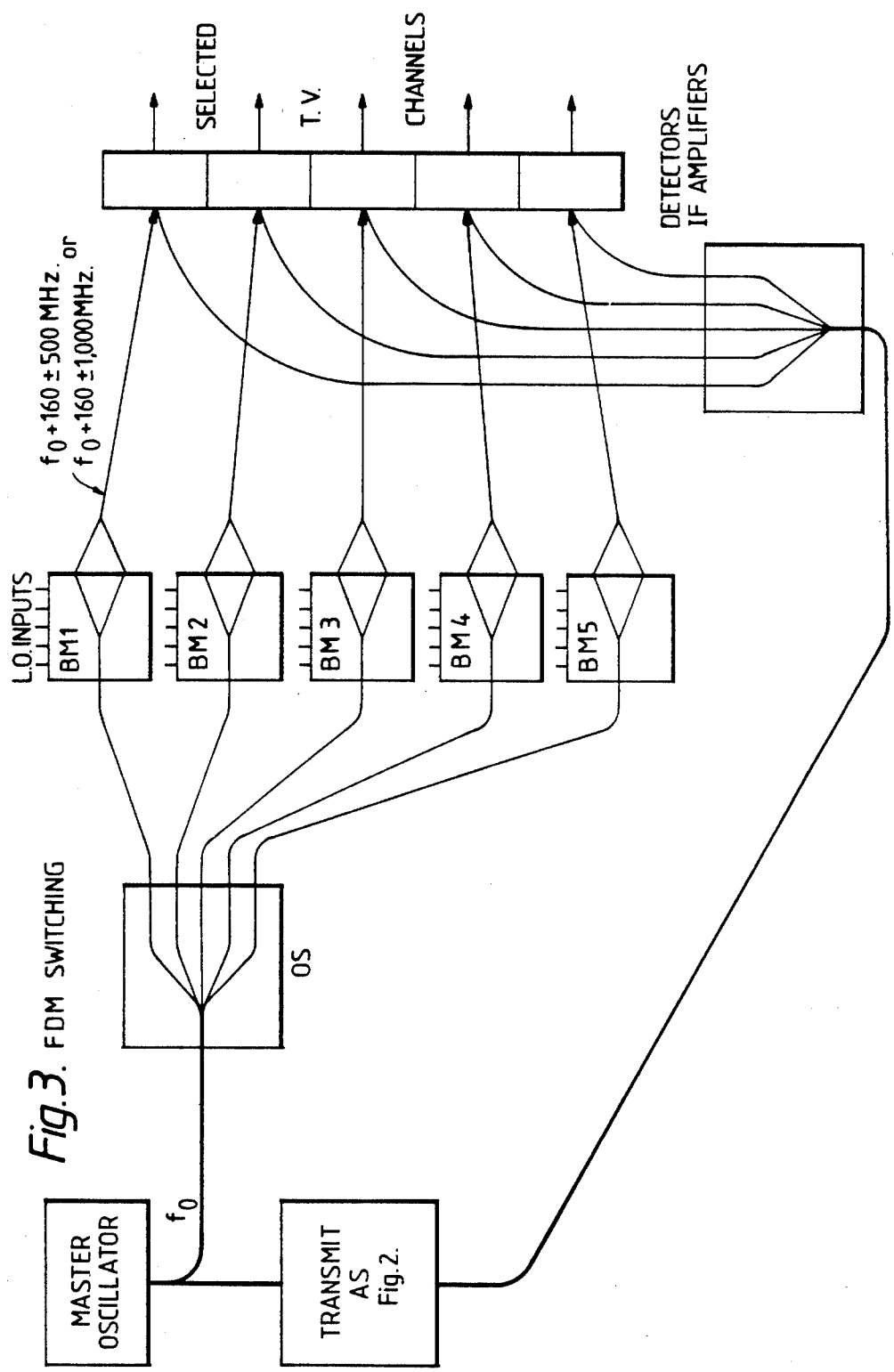

OPTICAL FDM SYSTEM

This invention relates to a frequency division multiplex (FDM) system, especially for use where the transmission medium is an optical fibre cable.

Frequency division multiplex is well-known, and has even been proposed for use in telephone exchanges, as in British Pat. No. 455279 (STC). It is in fact often referred to as multi-channel carrier.

An object of the invention is to provide an FDM system in which optical fibre cables are economically exploited.

SUMMARY OF THE INVENTION

According to the invention there is provided a frequency division multiplex (FDM) system in which the transmission medium is an optical fibre cable, which system provides a number of channels whose frequencies are widely and uniformly separated across the available frequency spectrum, wherein a single oscillator is associated with all of the channels and provides a single output frequency at or near to a central point of the frequency spectrum, wherein the single output frequency is applied to a modulation arrangement which generates therefrom a number of outputs each providing a carrier frequency for one of the channels, wherein the outputs are derived from the oscillator's output by the subtraction therefrom of a second frequency one or more times to give one or more further frequencies and by the addition of the second frequency to the oscillator's output to give one or more further frequencies, and wherein the further frequencies, or the further frequencies plus the original oscillator frequency are used as the carriers for the FDM channels.

Such an arrangement avoids the difficulties which could otherwise arise in an FDM system due to the relatively narrow bandwidth optical filters needed if the conventional techniques using filters are used.

An embodiment of the invention will now be described with reference to the drawings, in which:

BRIEF DESCRIPTION OF THE DRAWINGS

FIG. 2 is a multiplexer/demultiplexer arrangement for an FDM system embodying the invention, while FIG. 3 is an arrangement embodying the invention in which there is an element of switching.

DESCRIPTION OF THE PREFERRED EMBODIMENTS

Figure 1:
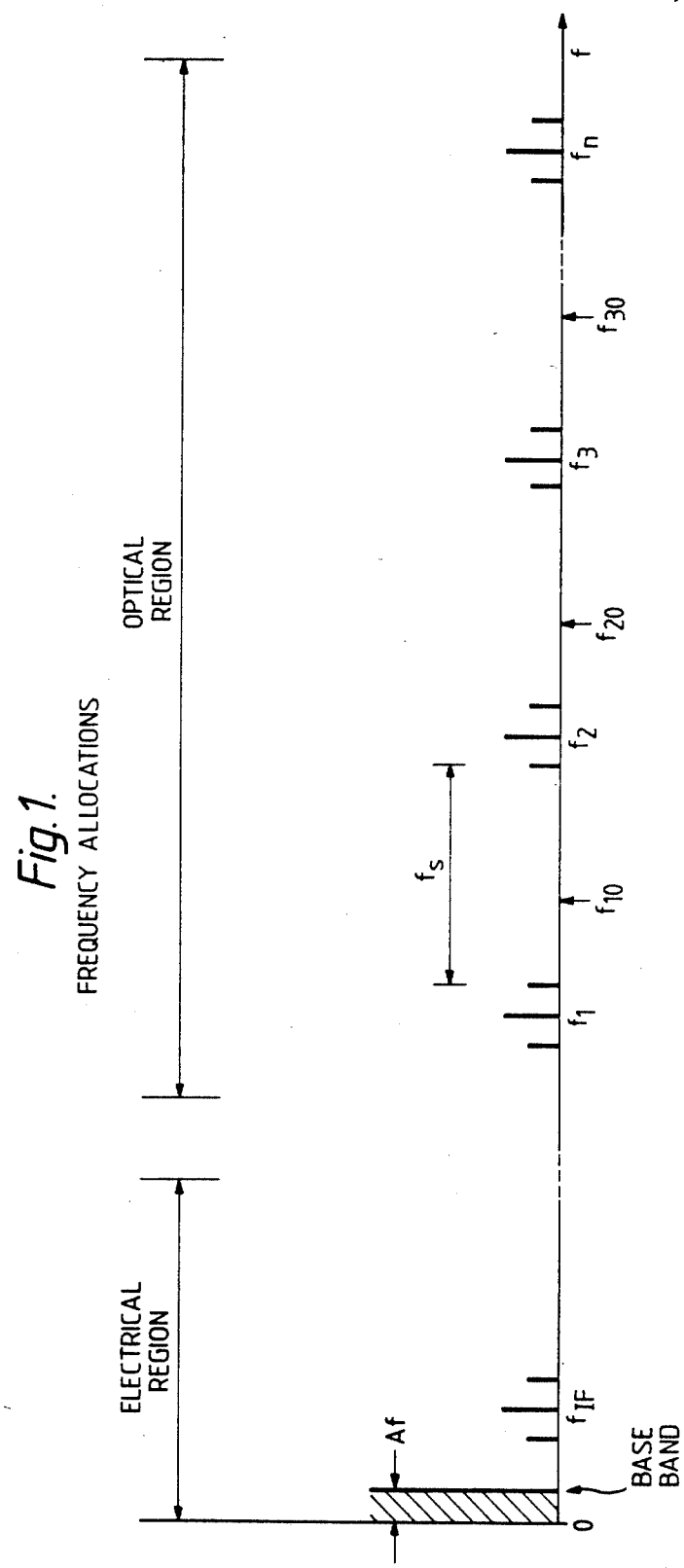
Fig. 1 is a diagram explanatory of the frequency spectrum used.

The principle on which the system is based is now described with reference to the frequency allocation diagram, illustrated in FIG. 1. The channels to be switched are modulated with double sidebands onto carrier frequencies $f_1 f_2 \ldots f_n$ and are of bandwidth $Df$. Between each pair of adjacent channels is an unused section of the frequency spectrum, as indicated in Equation 1.

$$f_s = f_n - f_{n-1} - 2Df \quad (1)$$

The local oscillator frequencies $f_{10}$, $f_{20}$, etc. are so allocated as to lie in these gaps above or below the signal frequencies at a frequency difference $f_{IF}$ therefrom. They are so chosen that $$f_{(n-1)0} - f_{n-1} = f_{IF} \quad (2)$$

To ensure that $f_n$ does not produce a signal at IF the condition must be met that:

$$(f_n - Df) - (f_{(n-1)0} + Df) > f_{IF} \quad (3)$$

From (1), (2) and (3), it will be seen that $f_s$ is greater than $2f_{IF}$ and the channel spacing is given by $$C_s = f_n - f_{n-1} = 2f_{IF} + 2Df \quad (4)$$

With a tolerance of $\pm T$ on the frequency stability of each channel oscillator and with the spectral line widths of the oscillators S, the channel spacing must be increased to $$C_s = 2f_{IF} + 2Df + 2T + 2S \quad (5)$$

We assume that some form of frequency control on the local oscillator is used to lock the difference frequency constant, so it is not necessary to consider a tolerance on the local oscillator frequencies. The spectral line width is assumed to be the same as for the channel oscillator.

The minimum IF gives the minimum channel spacing, and the minimum IF is 2Df, so that:

$$C_{Smin} = 4Df + 2T + 2S \quad (6)$$

With double side band modulation at least half the available channel bandwidth is wasted. Single side band modulation if usable could double the number of channels in the available spectrum but it is not clear how single side band modulation can be achieved. Double side band modulation as assumed above implies amplitude modulation of the light source. Such "Amplitude" Modulation of the guided wave is in fact a phase modulation process and for small modulation depths the double sidebands will extend many times beyond a range equal to the bandwidth of the modulating signal. This has been discussed in "Topics in Applied Physics—Integrated Optics", by J. M. Hammer (ed.T. Tamir); Vol.7, Springer-Verlag, 1982, pp 139–200. However, for large modulation depths, the phase modulation process becomes in effect an amplitude modulation one, because on extinction energy is lost by radiation, reflection or deflection from the straight-through path down the waveguide. The spectrum of the resultant amplitude modulated signal should therefore be confined largely to a frequency range equal to plus and minus its bandwidth. Regeneration of the digital signal after the receiver will in any case remove cross-talk components.

The same assumptions cannot however be made for analogue signals which demand linear modulation processes and considerably increased channel spacings are needed to accommodate the phase modulation spectrum. However, for a given type of information, digitisation normally increases bandwidth requirements so that the increased channel spacings are offset by the narrower inherent bandwidth of the information signal.

One problem with a heterodyning arrangement that requires switching (as opposed to demultiplexing) is that the local oscillator has to be able to be tuned over the complete frequency range. Semiconductor lasers currently available are unsuitable for this because their frequency of operation is related to their geometry.

To avoid this problem we use one master optical source for the entire switching or multiplexing/demultiplexing system and synthesise the required frequencies from this master oscillator using acousto-optic interactions. This has the added advantage that if the master optical source drifts in frequency all the other frequencies drift in sympathy with it, so the factor T in equation (5) can be set to zero. By making one high quality optical source supply, one should be able to afford a relatively expensive oscillator with good spectral line width, thus minimising S.

Figure 2:
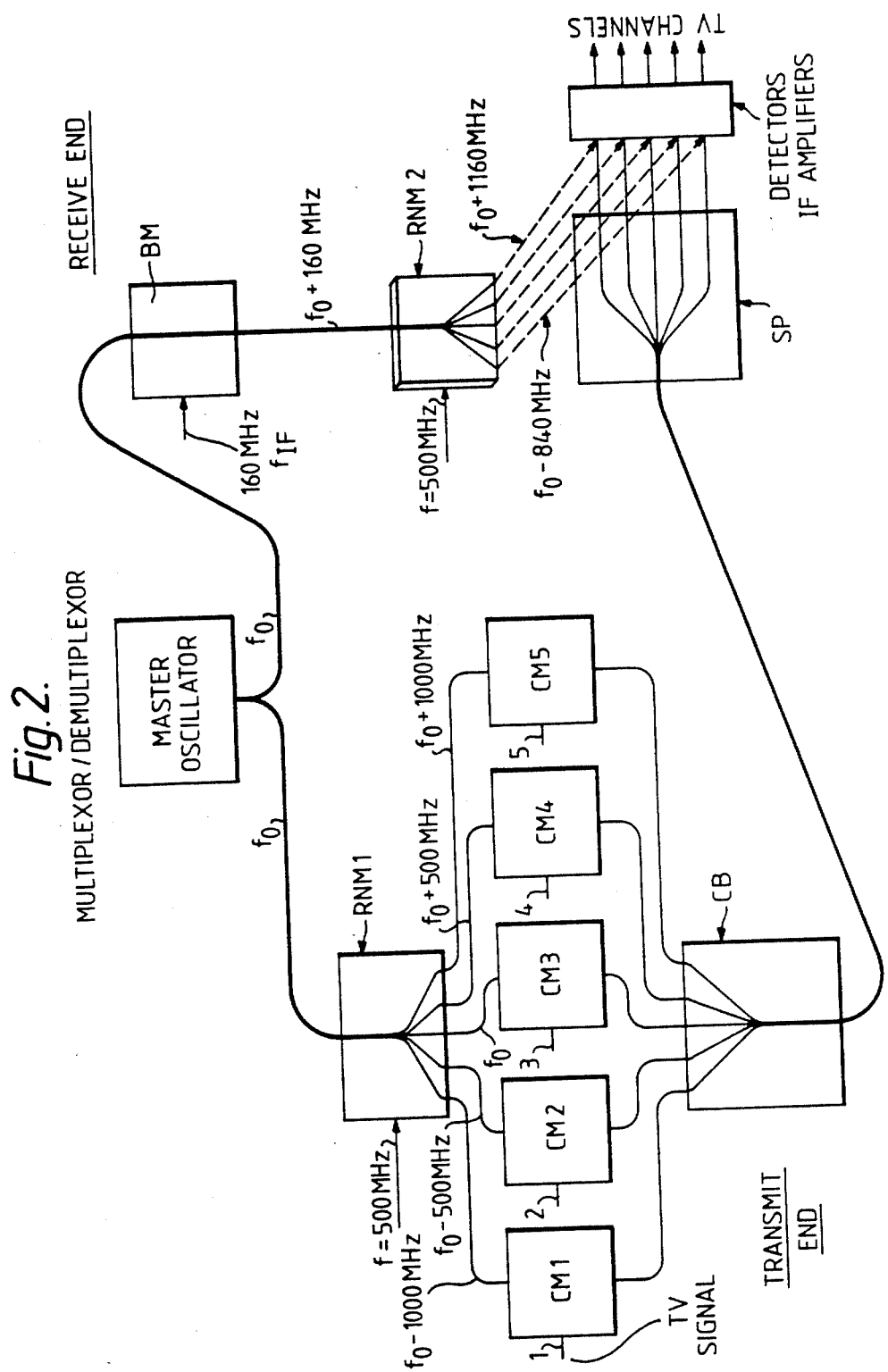

FIGS. 2 and 3 show arrangements based on the above discussed principles, FIG. 2 for the simpler multiplexing/demultiplexing case and FIG. 3 for a switching arrangement in which the incoming and outgoing channels do not bear a fixed relationship to each other. For illustration, we assume a specific example of five 70Mb/s digital TV channels, an intermediate frequency of 160 MHz, and a channel spacing of 500 MHz. Such a system could be usefully applied in a cable TV network.

In FIGS. 2 and 3 the transmission (multiplexing) ends are identical.

The master oscillator output is split, with half the energy or more going to the receive end and the remainder to the transmit end. The transmit signal is fed into an optical splitter RNM 1 working in the Raman Nath (RN) regime, for which see the reference quoted above. Also of interest in this respect is "Interaction Between Light and Sound" by R. Adler, IEEE Spectrum, V4, No. 5, pp 42-54, May, 1967. This splitter RNM1 also has an input via which a 500 MHz signal is applied. The phase excursion or the modulation index of the device RNM1 is such as to make the carrier and higher order sidebands have the same amplitude. For the five channel arrangement shown this means that the carrier, the first order and second order sidebands corresponding to Bessel function $J_0$, $J_1$ and $J_2$ must have roughly equal amplitudes. A modulation index of about 3 radians meets this criterion. When frequency modulating the input, the device RNM1 also splits its input spacially into five outputs of frequencies $f_0$, $f_0+$ or $-f_m$ and $f_0+$ or $-2f_m$. Each of these outputs is then modulated in one of the channel modulators CM1-CM5 by one of the TV signals, and they are then combined in a combiner CB, whose output is applied to an optical fibre cable. Such a combiner, and also an optical splitter, may be an optical star-coupler, or the equivalent thereof. Combination can be, as just indicated, by optical means (collimation and focussing) if the functions are on separate chips or, if they are in waveguides on the same chip, by one of the standard waveguide coupling techniques.

Thus finally the combined output is transmitted along a fibre or guide to the receive end. The receive end part of the master oscillators output is also transmitted along another guide or fibre to the receive end to act as the local oscillator source.

In FIG. 2 for the multiplex/demultiplex requirement, the receive end contains a Bragg modulator device BM which shifts the local oscillator signal by an amount equal to the IF frequency, upwards in the present case. The signal is then split by another Raman Nath Modulator RNM2 into constituent frequencies; $f_0+f_{IF}$, $f_0+f_{IF}+$ or $-f_m$ and $f_0+f_{IF}+$ or $-2f_m$.

The information signal is split on reception by well-known means (not shown), which pass via the block marked DETECTORS—IF AMPLIFIERS, into five equal channels using a splitter SP which works on a waveguide decoupling technique. Once split these channels are respectively combined with the relevant local oscillator outputs from the device RNM2. This combination can be on the chip or directly at the photodetector. Mixing takes place in the photodetector and the resultant electrical signal is filtered and amplified to give five separate TV channels.

In FIG. 3 for the switching case it is necessary for each of the five local oscillator frequencies to be potentially available for any channel. To achieve this the receiver local oscillator output is split by a simple optical splitter OS into five equal parts, and each part is fed to a separate Bragg device BM1 to BM5. Each Bragg device can be acoustically modulated with signals at the IF frequency, at the IF frequency + or $-f_m$, or at the IF frequency + or $-2f_m$, as required. Such modulation needs several acoustic transducers only one of which is energised at any one time, and results in different Bragg angles at each frequency. The output is then collimated and focussed before application to the mixer. From that point on, operation is identical to the multiplexer case.

Although the above has taken a digitised TV signal as an example, the principle is equally applicable to an analogue TV signal; the major difference is that the channel bandwidth would be smaller (say 5 MHz) but the channel spacing greater (say 100 MHz) in terms of multiples of bandwidth. The resultant designs are not therefore greatly dissimilar from what has been described. Thus by an apparently profligate use of the optical spectrum and filtering by electrical means the shortcomings of filtering at optical frequencies can be overcome.

We have assumed that the application for such a system is to the switching and/or multiplexing of wide band video channels. However, it is also possible to extend the system to the 30 channels said to be needed for an advanced CATV system.

We claim:

1. A frequency division multiplex (FDM) system in which the transmission medium is an optical fibre cable, which system comprises a number of channels whose frequencies are widely and uniformly spaced across the available frequency spectrum, and comprises a single oscillator associated with all of the channels which provides a single output frequency at or near to a central point of the frequency spectrum, and comprising a modulation arrangement to which the single output frequency is applied and which generates therefrom a number of outputs each providing a carrier frequency for one of the channels, wherein the outputs are derived from the oscillator's output by the subtraction therefrom of a second frequency one or more times to give one or more further frequencies and by the addition to the second frequency to the oscillator's output to give one or more further frequencies, and wherein the further frequencies, or the further frequencies plus said single oscillator frequency are used as the carriers for the FDM channels in which the modulation arrangement is a Raman-Nath device to which an oscillator frequency $f_0$ and the further frequency f are both applied, and in which the Raman Nath device provides $2N+1$ outputs at frequencies, N of which are below $f_0$ and N of which are above f, and in which N=2, so that the Raman Nath device provides outputs at frequencies $(f_0-2f)$, $(f_0-f)$, f, $(f_0+f)$ and $(f_0+2f)$ and further comprising $2N+1$ channel modulators, to each of which a respective output of the Raman Nath device is applied, one per channel served, and in which the outputs of the channel modulators are combined in a combiner for application to an optical fibre connected to a remote station and further comprising a further optical fibre to which the output of the oscillator is connected and which is also connected to the remote station whereby it can detect the signals on the various channels and further comprising an optical splitter at each remote station which functions to give $2N+1$ similar outputs, a set of $2N+1$ Bragg modulators, one per channel, to which said similar outputs are respectively applied, and comprising a further optical splitter which receives an output from the combiner, and functions to give $2N+1$ outputs, and in which the outputs from the Bragg modulators and from the further optical splitter are respectively combined to effect detection.

* * * * *